United States Patent [19]

Coats et al.

[11] 4,277,980
[45] Jul. 14, 1981

[54] APPARATUS AND METHOD FOR INDICATING SOUND LEVELS

[75] Inventors: Montgomery R. Coats, Oklahoma City, Okla.; Turner C. Pendleton, deceased, late of Oklahoma City, Okla.; Reine H. Pendleton, 1910 N. Indiana, Oklahoma City, Okla. 73106

[73] Assignees: Reine H. Pendleton, Oklahoma City, Okla.; Claude A. Pendleton, Dallas, Tex.; Sue Pendleton Coats, Edmond, Okla. ; a part interest

[21] Appl. No.: 19,608

[22] Filed: Mar. 12, 1979

[51] Int. Cl.³ .......................................... G01N 29/00
[52] U.S. Cl. ...................................... 73/646; 73/647; 179/1 N
[58] Field of Search .................. 73/646, 647; 179/1 N

[56] References Cited

U.S. PATENT DOCUMENTS

| | | |
|---|---|---|
| 2,590,460 | 3/1952 | Rackey et al. . |
| 2,884,085 | 4/1959 | Von Wittern et al. . |
| 2,982,914 | 5/1961 | Stewart . |
| 3,014,550 | 12/1961 | Gales et al. . |
| 3,089,561 | 5/1963 | Michael et al. . |
| 3,144,089 | 8/1964 | Lane et al. . |
| 3,236,327 | 2/1966 | Church et al. . |
| 3,545,564 | 12/1970 | Barber . |
| 3,615,162 | 10/1971 | Barber . |
| 3,696,206 | 10/1972 | Ida et al. . |
| 3,747,703 | 7/1973 | Knowd et al. . |
| 3,778,552 | 12/1973 | Edinborgh . |
| 3,802,535 | 4/1974 | Peake et al. . |
| 3,848,471 | 11/1974 | Hamburg et al. . |
| 3,868,857 | 3/1975 | Maddox et al. . |
| 3,884,086 | 5/1975 | Steger . |
| 3,892,133 | 7/1975 | Quinn ..................................... 73/647 |
| 3,977,257 | 8/1975 | Steger . |
| 4,143,648 | 3/1979 | Cohen et al. ........................ 179/1 N |

Primary Examiner—Anthony V. Ciarlante
Attorney, Agent, or Firm—Laney, Dougherty, Hessin & Beavers

[57] ABSTRACT

A sound level indicator apparatus includes a signal processing element which detects and processes sound pressure waves into quantifiable electrical signals. The indicator also includes an adjustment member which adjusts the quantifiable signals to compensate for intrinsic electrical variations in the processing element. Further included is a monitoring member which detects when the received sound is below a predetermined level. The indicator still further includes an indicator element which displays the quantified quantifiable signals and the low level monitor detection signal. The sound level indicator is operatively combined with a digital watch integrated circuit for containment in a case which is wearable on one's wrist.

25 Claims, 6 Drawing Figures

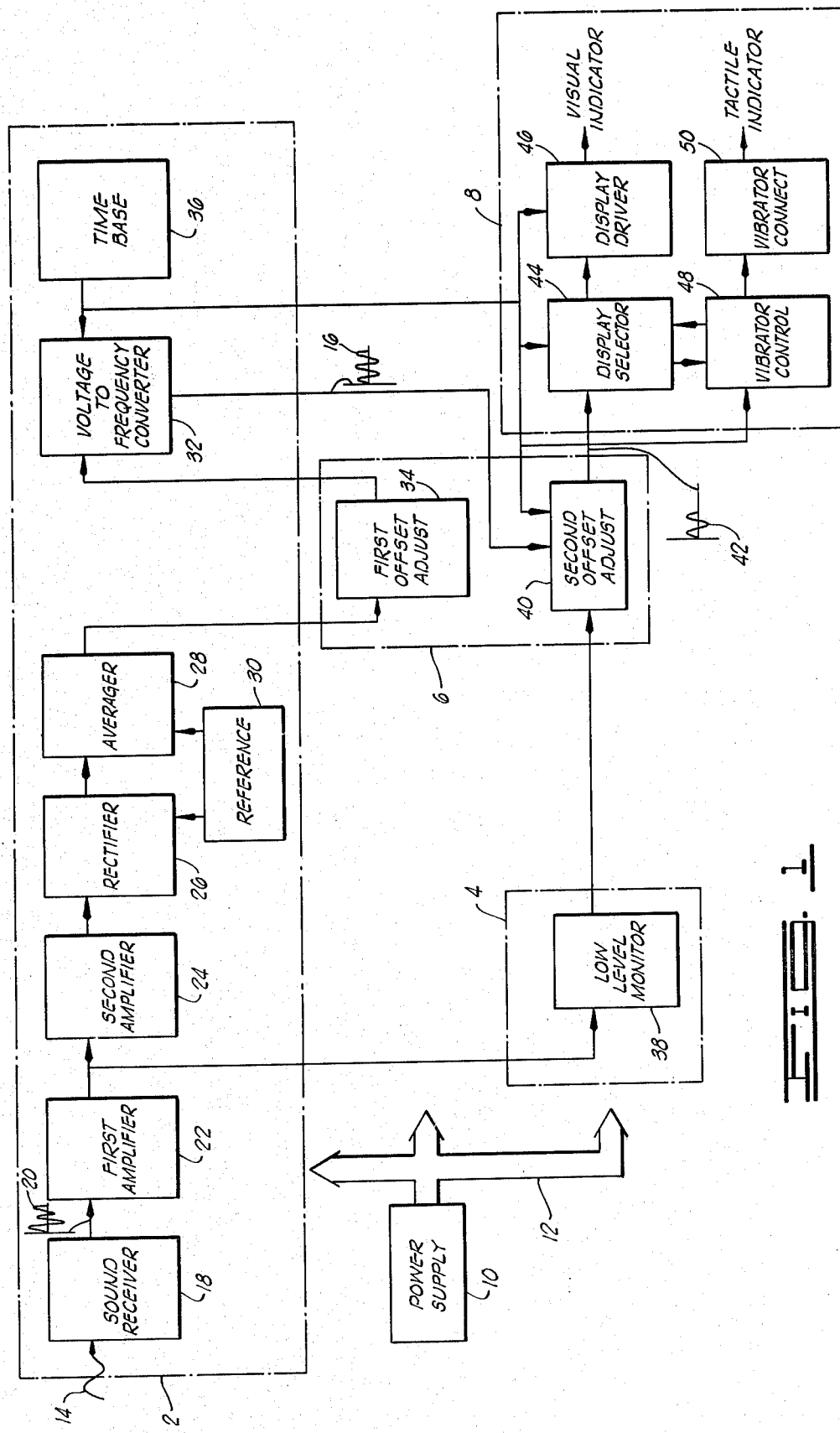

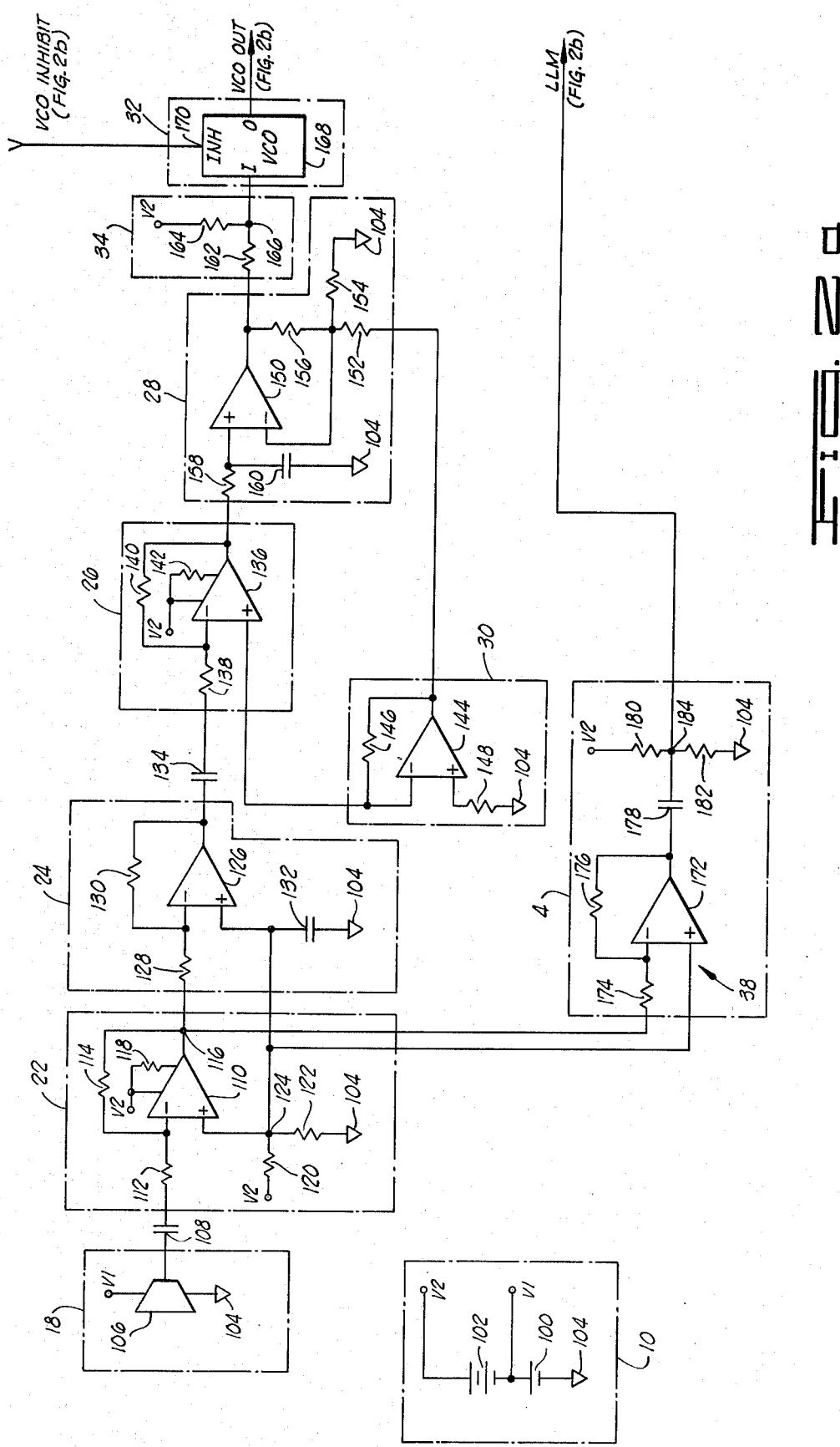

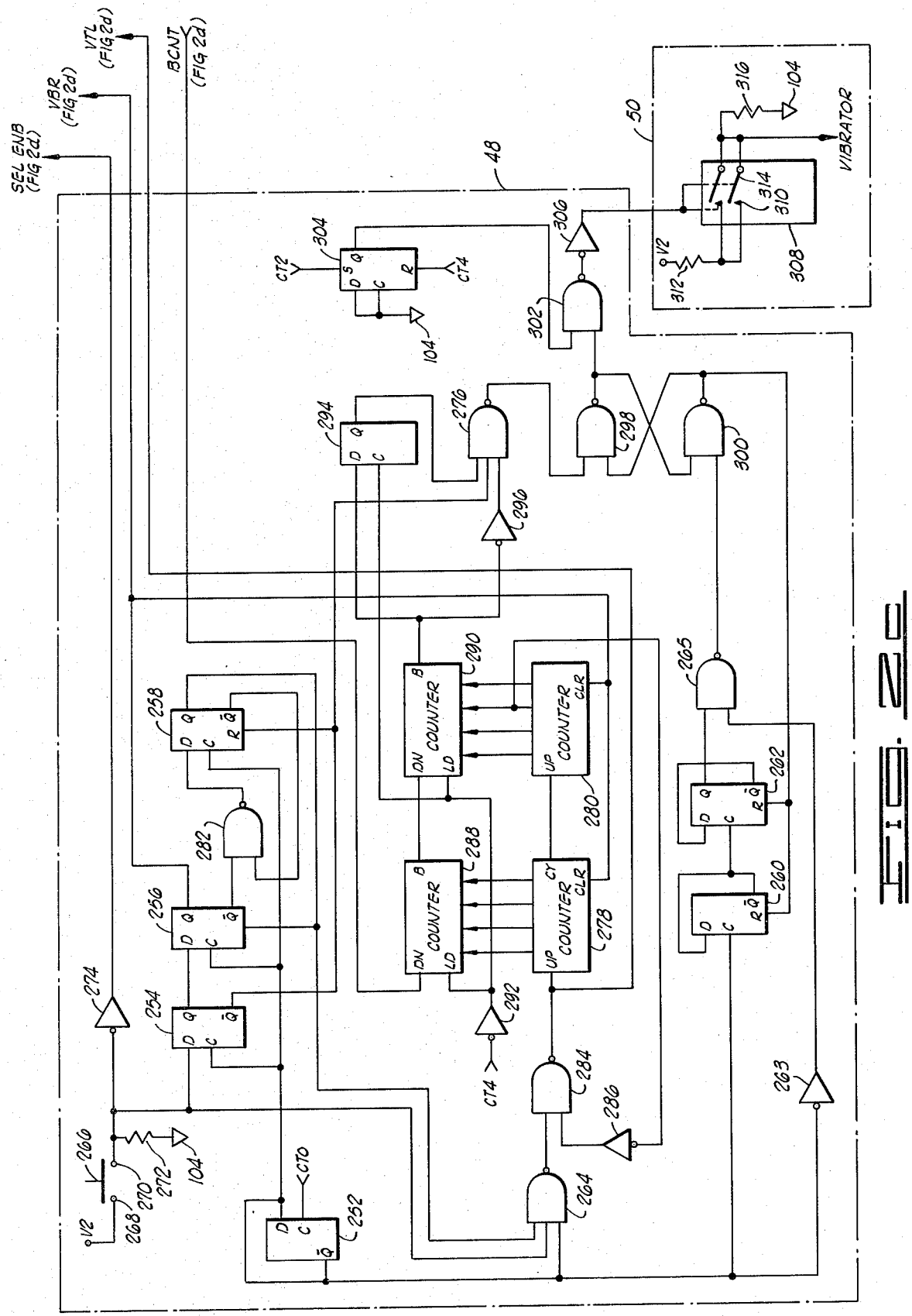

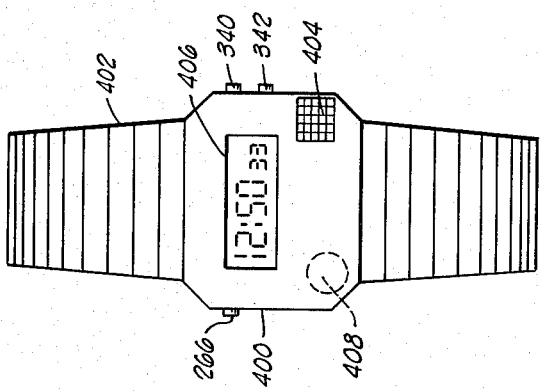
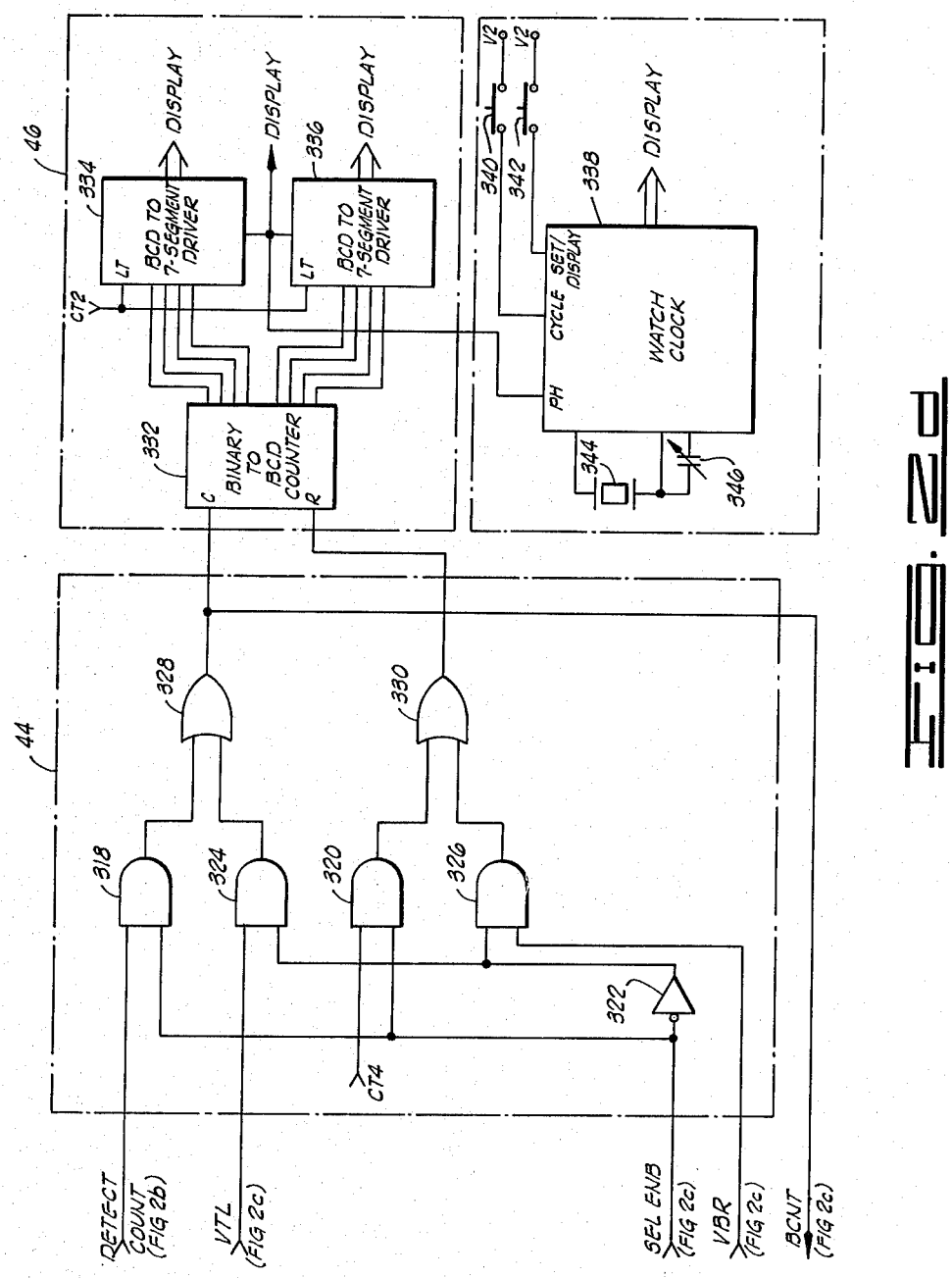

APPARATUS AND METHOD FOR INDICATING SOUND LEVELS

BACKGROUND OF THE INVENTION

1. Field of the Invention

This invention relates generally to apparatus for indicating the presence of sounds and more particularly, but not by way of limitation, to apparatus for indicating both the time of day and the relative level of sound intensity present in the environment of the apparatus.

2. Description of the Prior Art (Prior Art Statement)

The following statement is intended to be a Prior Art Statement in compliance with the guidance and requirements of 37 C.F.R. SS1.56, 1.97 and 1.98.

U.S. Pat. No. 2,982,914 issued to Stewart discloses a noise meter proposed to include a microphone, amplifiers, a rectifier, an integrator, and an indicator. This proposal is directed to indicating a measurement which is proportional to the hazardous effects of a noisy environment.

U.S. Pat. No. 3,802,535 issued to Peake et al. discloses an acoustic noise exposure meter which is proposed to detect sound intensity levels above 90 dB. The device is proposed to include a receiver, an AC-to-DC converter, a voltage-controlled oscillator, a noise threshold comparator, and a counter for displaying a measurement representing total noise to which a person has been exposed.

U.S. Pat. No. 3,747,703 issued to Knowd et al. discloses a noise exposure computer and method which are proposed to indicate cumulative noise exposure. This patent indicates the use of operational amplifiers in the circuits of the proposed device. Another patent disclosing the use of operational amplifiers in sound indicators is U.S. Pat. No. 3,545,564 issued to Barber.

In addition to the above patents, Applicant knows of the following patents which also disclose sound level indicators:

| Patent No. | Inventor |
|---|---|
| 2,590,460 | Rackey et al. |
| 2,884,085 | Von Wittern et al. |
| 3,089,561 | Michael et al. |
| 3,236,327 | Church et al. |
| 3,615,162 | Barber |
| 3,848,471 | Hamburg et al. |

Applicant believes that these patents are generally directed to apparatus for detecting high sound levels, or "noise". Specifically, the following patents known to Applicant are directed to noise pollution hazards and the Walsh-Healey law noise criteria:

| 3,696,206 | Ida et al. |
|---|---|
| 3,778,552 | Edinborgh |
| 3,868,857 | Maddox et al. |
| 3,884,086 | Steger |
| 3,977,257 | Steger |

Other noise exposure meter patents known to Applicant are U.S. Pat. No. 3,014,550 issued to Gales et al. and U.S. Pat. No. 3,144,089 issued to Lane et al. which propose the use of electrochemical integrator units in their indicators.

As shown by the above-mentioned disclosures, there is a need for an apparatus which indicates levels of sound. Applicant believes that these prior proposals have been directed to protecting people who have normal hearing by indicating to them the presence of continuous levels of noise (i.e., sound intensity levels above approximately 90 dB). However, for people having hearing impediments there is a need for a device which can alert them to the presence of lower levels of sound.

Such a device is needed to indicate the loudness of a user's own voice. A device having this feature would be advantageous to a user who wears a hearing aid by aiding the user in properly setting the sensitivity of the hearing aid.

Such a lower level sound indicator would also be useful in providing an awareness of sound in general. For example, this device would alert the user to conversation or to the ringing of a doorbell. More specifically, such a device would provide a warning of potential hazards by notifying the user of sounds emitted by such things as smoke detectors, fire alarms, car horns and other people.

In order to supply these uses there is a need for such a sound detecting device to detect sound intensities within syllabic time periods instead of long-term time periods. There is also the need for a low level monitor within such device for detecting sound levels which are below the normally detected levels and for detecting high sound levels existing for time periods which are shorter than those normally detected.

Additionally there is a need for such a device to be compact so that it can be conveniently worn by the user. In particular it would be advantageous for such a device to be combined with a wrist-watch. To achieve such a small size there is a further need for the device to consume as little power as possible. Therefore, there is a need for relatively high power consuming elements within the device to be duty-cycled to reduce the drain on the power supply. Still further, to maintain a small size there is a need for a simple means for automatically adjusting offset errors resulting from the intrinsic characteristics of the components of the sound level indicator. By satisfying this need a continuously accurate readout can be maintained while still achieving the compact size.

Although the previously cited prior art known to Applicant discloses various proposals pertaining to sound level indicators, Applicant believes that this prior art fails to disclose, either individually or collectively, the present invention which satisfies the needs stated above.

SUMMARY OF THE INVENTION

The present invention overcomes the above-noted and other shortcomings of the prior art by providing a novel, useful and improved sound level indicator which meets the previously stated needs and advantages. The present invention alerts people having hearing impediments, or any other user of the device, to the presence of sounds by providing both visual and tactile indications thereto.

The present invention detects sound within syllabic time periods and monitors low sound intensity levels for notification thereof to the user of the present invention.

Additionally, the present invention exhibits a small size believed never to have been achieved by previously proposed sound level indicators. This small size is achieved in part because the present invention consumes small amounts of power by duty cycling relatively high power consuming components, thus permitting the use of compact power supplies. This small size is further achieved through the use of a compact means for automatically adjusting offset characteristics intrinsic to electronic devices. Through the use of this automatic offset adjustment a constant count per sound level is maintained over battery voltage variation and component characteristic variation.

A preferred embodiment of the present invention includes five integrated circuit chips. Among these are two operational amplifier chips, a voltage-controlled oscillator chip, a custom CMOS chip and an electronic switch chip. These chips are operatively interconnected along with an assortment of resistors and capacitors. Also appropriately connected are a microphone for detecting the presence of sound pressure waves and a battery for providing a source of power to the circuits.

In the preferred embodiment of the present invention the sound level indicator is combined with a digital watch. This combination increases the total number of integrated circuit chips to six by including a monolithic integrated circuit watch chip. Associated with the watch chip is a watch crystal for providing a timing frequency thereto.

In the preferred embodiment of the present invention these appropriately combined circuit elements are placed in a case such as a wristwatch body. This wristwatch body has associated therewith a six-digit visual display. This display is appropriately connected to the circuit elements so that the first four digits display the hours and minutes, the month and day, or the seconds, depending upon the selected mode. The last two digits display, again depending upon the selected mode, either the detected sound intensity level or the trigger level for a vibrator which is mounted in the wristwatch body for external extension therefrom. Also mounted in the body are three switches which can be externally manipulated for selecting the previously mentioned modes. Two of these switches are used to control the watch. The remaining switch is used to set the trigger level at which the vibrator activates.

The sound level indicator of the present invention receives a sound pressure wave through the microphone and processes the resultant electrical signals through a signal processing means into groups of digital pulses. Associated with the signal processing means is a monitoring means which indicates when the received sound pressure waves are below a predetermined level. Associated with both of these means is an adjustment means which monitors each group of digital pulses and also any signals provided by the monitoring means. Utilizing these, the adjustment means adjusts the number of pulses in each group of digital pulses to correct for any errors in pulse count resulting from the inherent offset characteristics of the electronic components or resulting from a decrease in the battery output. Once this correction is made, the adjusted count is connected to an indicator means which, in a preferred embodiment, both visually displays and tactilely indicates the presence of certain sound levels.

In light of the above, it is a general object of the present invention to provide a novel, useful and improved sound level indicator. Other and further objects, features and advantages of the present invention will be readily apparent to those skilled in the art upon a reading of the description of the preferred embodiment which follows, when taken in conjunction with the accompanying drawings.

BRIEF DESCRIPTION OF THE DRAWINGS

FIG. 1 is a functional block diagram of the elements of the preferred embodiment of the present invention.

FIGS. 2a-2d form a schematic drawing of the preferred embodiment electronic circuit of the elements of the present invention shown in FIG. 1.

FIG. 3 is a top plan view of the preferred embodiment of the wristwatch/sound level indicator of the present invention.

DETAILED DESCRIPTION OF A PREFERRED EMBODIMENT OF THE INVENTION

Figure 2B:
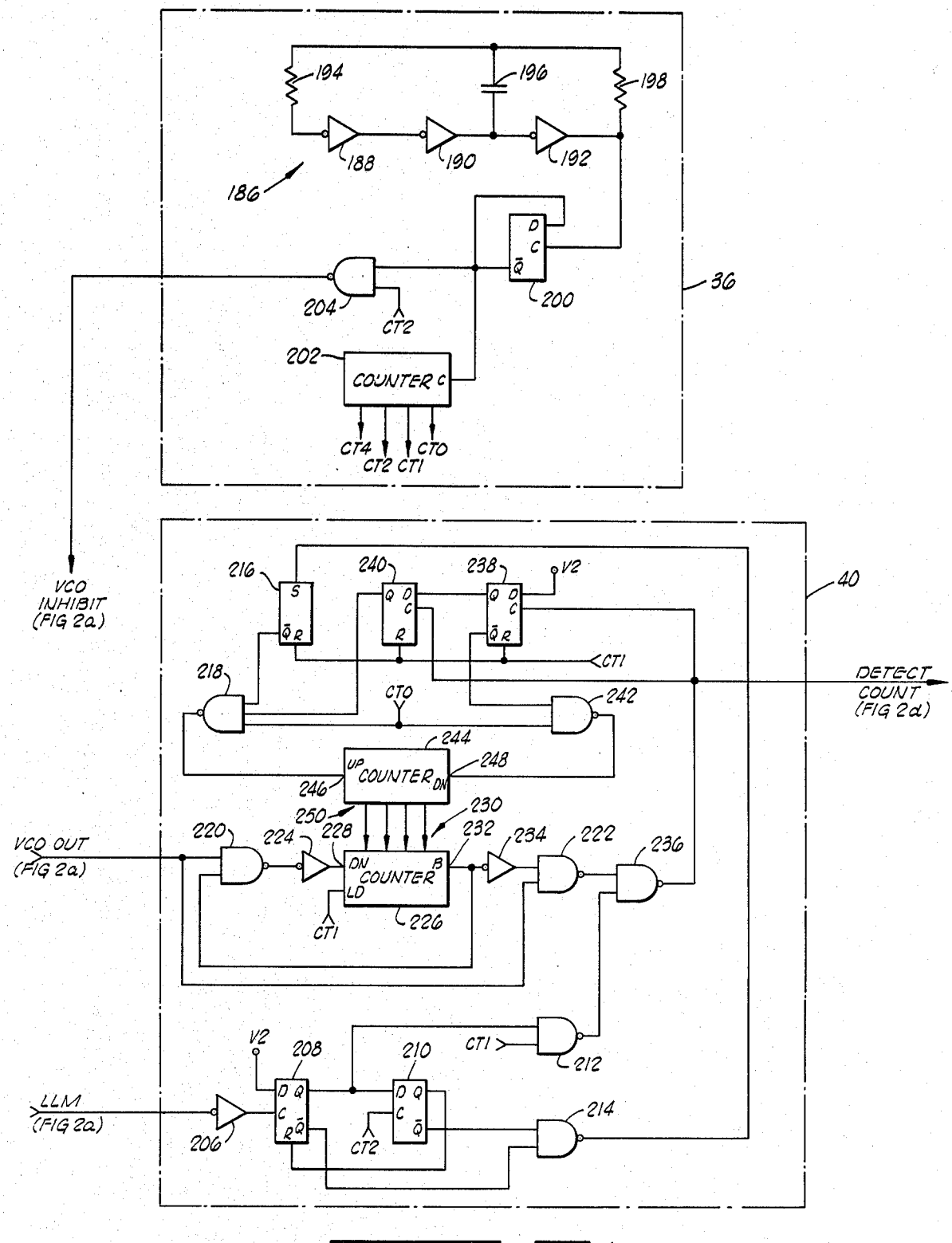

Referring now to the drawings, and FIG. 1 in particular, a functional block diagram of the circuit elements of a preferred embodiment of the sound level indicator of the present invention is shown. This preferred embodiment circuit includes five primary functional units. These units include a signal processing means 2, a monitoring means 4, an adjustment means 6, an indicator means 8, and a power supply 10 which energizes the first four units by means of a schematically represented bus 12.

The signal processing means 2 detects the intensities of sound pressure waves 14 and transforms these intensities into unadjusted quantifiable signals 16 which are to be adjusted and then measured. This detection and transformation process initiates with a receiver means 18 receiving the pressure waves 14 and converting them into primary electrical signals 20. Further processing is done by a first amplifier means 22 which is connected to the receiver means 18. Connected to the first amplifier means 22 is a second amplifier means 24 which further processes the electrical signal 20. Connected to the second amplifier means 24 is a rectifier means 26 which rectifies the amplified primary signal 20. Connected to the rectifier means 26 for the purpose of creating a signal having a magnitude which is an average of the previously rectified primary signal 20 is an averaging means 28. Also connected to the rectifier means 26 is a voltage reference means 30 which is further connected to the averaging means 28. Also connected to the averaging means 28 is a voltage-to-frequency converter means 32 having a characteristic input activation level which is the threshold above which the means 32 converts voltage to frequency. It is to be noted in the preferred embodiment shown in FIG. 1 that the voltage-to-frequency converter means 32 is connected to the averaging means 28 through a first offset adjust means 34 which will be subsequently described. Completing the signal processing means 2 is a timing means 36 which is connected to the voltage-to-frequency converter means 32, the adjustment means 6 and the indicator means 8.

Associated with the signal processing means 2 is the monitoring means 4. The monitoring means 4 indicates when the intensities of the sound pressure waves 14 are below a predetermined level by monitoring the primary electrical signals 20. In particular the monitoring means 4 includes a detection member 38 which is connected to the first amplifier means 22. The detection member 38 monitors the electrical signals 20 and detects those which are low level, i.e., those which are below the previously mentioned predetermined level. This low level monitor provides an electrical signal for indicating when such predetermined level has not been exceeded.

The adjustment means 6 is associated with the signal processing means 2 and the monitoring means 4 to correct errors in the number of the unadjusted quantifiable signals 16. These errors may arise from such factors as the intrinsic offset voltage characteristics of certain electrical components or the varying voltage levels of the power supply 10 as it changes with time. The adjustment means 6 includes the first offset adjust means 34 previously stated to be connected to the averaging means 28 and the voltage-to-frequency converter means 32. The adjustment means 6 also includes a second offset adjust means 40 which is connected to the voltage-to-frequency converter means 32 and to the low level monitoring detection member 38. Through the functioning of the first offset adjust means 34 and the second offset adjust means 40, the unadjusted quantifiable signal 16 is corrected to an adjusted quantifiable signal 42 so that a consistent number of quantifiable portions of the electrical signal is provided each time pressure waves having substantially identical magnitudes are detected and transformed by the sound processing circuit means.

The indicator means 8 is associated with the adjustment means 6, particularly the second offset adjust means 40, to receive the adjusted quantifiable signal 42 for measurement thereof and display of that measurement. Furthermore, the indicator means 8 detects and indicates when the adjusted quantifiable signal 42 exceeds a variable trigger level. The indicator means 8 includes a display selector means 44 which is controlled to select the appropriate data to be displayed. The selector means 44 is connected to the second offset adjust means 40 and the timing means 36. Also included in the indicator means 8 is a display driver means 46 which is connected to the display selector means 44. The display driver means 46 provides the interface to a visual indicator such as a six-digit liquid crystal display. Additionally within the indicator means 8 is a vibrator control means 48 associated with the timing means 36 and the display selector means 44. The vibrator control means 48 provides means for selecting the variable trigger level and for detecting when a selected level is exceeded by the adjusted quantifiable signal 42. Still further, the indicator means 8 includes a vibrator connect means 50 which is associated with the vibrator control means 48. The vibrator connect means 50 provides the interface to a tactile indicator means such as a vibrator.

Referring now to FIGS. 2a–2d, one will observe a schematic diagram showing, to some detail, the preferred embodiment electronic components which are used to construct the previously described functional blocks. It is to be noted in the following discussion of this schematic diagram that the references to specific types or values of components are made to indicate the best mode of the present invention known to Applicant at the time of this application and are not to be taken as indicating any limitations on possible types or values which may be used.

The power supply 10 is shown in FIG. 2a to include a first means for producing electric energy, such as a first battery 100, and a second means for producing electric energy, such as a second battery 102. The first battery 100 has its negative terminal connected to a ground, or common, 104 and has its positive terminal connected to a portion of the bus 12 to provide a voltage V1 therealong. In particular, the first battery 100 may be a Panasonic WL-14 silver oxide button type, 1.5-volt battery. The second battery 102 has its negative terminal connected to the positive terminal of the first battery 100 and has its positive terminal connected to another portion of the bus 12 so that the second battery 102 in combination with the first battery 100 provides a voltage V2 therealong. In particular, the second battery 102 may be a Sanyo LF-½W, 3-volt battery. The voltages V1 and V2 are distributed throughout the present invention to supply electric energy where appropriate.

The receiver means 18 includes a sound wave detection means such as a microphone 106. The microphone 106 is shown in FIG. 2a to be connected between the common 104 and V1. Specifically, the microphone 106 may be a Knowles BT-1750 microphone.

The first amplifier means 22 is coupled to the microphone 106 through a first capacitor 108. The first capacitor 108 may have a capacitance of 0.47 microfarad ($\mu$f). The first amplifier means 22 processes the electrical signal from the microphone 106 by means of an operational amplifier (op-amp) 110 having resistors connected thereto as shown in FIG. 2a. The inverting input of the op-amp 110 is connected to the first capacitor 108 through a first resistor 112. The first resistor 112 may have a value of 47 kilohm (k$\Omega$). Also connected to the inverting input of the op-amp 110 is one end of a second resistor 114 which may have the resistance of 1 M$\Omega$. The other end of the resistor 114 is connected to the output of the op-amp 110 at a first junction 116. Also connected to the amplifier 110 is a third resistor 118 which is connected between appropriate terminals of the amplifier 110 to provide compensation thereto as is known in the art. In particular, the resistor 118 is connected to set the bias current and frequency response of the operational amplifier 110. The third resistor 118 may have a value of 1.5 M$\Omega$. Connected to the non-inverting input of the op-amp 110 are a fourth resistor 120 and a fifth resistor 122. One end of the resistor 120, which may have a value of 2.2 M$\Omega$, is connected to one end of the resistor 122, which may also have a value of 2.2 M$\Omega$, at a second junction 124, which junction 124 is connected to the non-inverting input of the op-amp 110. The other end of the resistor 120 is connected to the voltage V2, whereas the other end of the resistor 122 is connected to the common 104. This connection of resistors 120 and 122 establishes a reference which insures the linear operation of the various components connected to the junction 124.

The second amplifier means 24 is connected to the output of the first operational amplifier 110. The second amplifier means 24 provides further signal processing by means of a second operational amplifier 126 having appropriate connections made thereto as shown in FIG. 2a. Coupling the output of the first operational amplifier 110 to the second operational amplifier 126 is a sixth resistor 128 having one end connected to the first junction 116 and the other end connected to the inverting input of the second operational amplifier 126. The sixth resistor 128 may have a value of 500 k$\Omega$. Further connected to the inverting input of the op-amp 126 is one end of a seventh resistor 130. The other end of the resistor 130 is connected to the output of the amplifier 126. The seventh resistor 130 may have a value of 3 M$\Omega$. Connected to the non-inverting input of the op-amp 126 is the second junction 124 and one end of a second capacitor 132. The other end of the capacitor 132 is connected to the common 104. The capacitor 132 may have a value of 3300 picofarads (pf).

The rectifier means 26 is coupled to the output of the second operational amplifier 126 through a third capacitor 134 which may have a value of 0.1 $\mu$f. The rectifier means 26 processes the received signal to half-wave rectify it at a predetermined reference level provided by the voltage reference means 30. This rectification is performed through the use of a third operational amplifier 136. The inverting input of the op-amp 136 is connected to the third capacitor 134 through an eighth resistor 138. The eighth resistor 138 may have a value of 1 MΩ. Connected between the inverting input and the output of the operational amplifier 136 is a ninth resistor 140. The ninth resistor 140 may have a value of 2.7 MΩ. Further connected to the operational amplifier 136 is a tenth resistor 142 which is connected between appropriate terminals of the amplifier to provide compensation thereto as is known in the art. The reference level at which the rectifier means 26 rectifies is provided by the reference means 30 to the non-inverting input of the third operational amplifier 136.

The voltage reference means 30 includes a fourth operational amplifier 144 which has its inverting input connected to the non-inverting input of the third operational amplifier 136. Also connected to the inverting input of the op-amp 144 is one end of an eleventh resistor 146. The other end of the resistor 146 is connected to the output of the fourth operational amplifier 144. The eleventh resistor 146 may have a value of 2.7 MΩ. Connected between the non-inverting input of the fourth operational amplifier 144 and the common 104 is a twelfth resistor 148 which may have a value of 2.7 MΩ. In addition to providing a reference to the rectifier means 26, the voltage reference means 30 provides a reference level to the averaging means 28.

The averaging means 28 includes a fifth operational amplifier 150 which receives the output from the fourth operational amplifier 144 at its inverting input through a thirteenth resistor 152. The thirteenth resistor 152 may have a value of 1.56 MΩ. Also connected to the inverting input of the op-amp 150 is one end of a fourteenth resistor 154. The other end of the resistor 154, which may have a value of 10 MΩ, is connected to the common 104. Further connected to the inverting input is one end of a fifteenth resistor 156 which may have a value of 2.7 MΩ. The other end of the resistor 156 is connected to the output of the op-amp 150. The output of the third operational amplifier 136 is received at the non-inverting input of the op-amp 150 through a sixteenth resistor 158. The resistor 158 may have a value of 1 MΩ. Also connected to the non-inverting input is one end of a fourth capacitor 160 which has its other end connected to the common 104. The fourth capacitor may have a capacitance of 0.47 µf.

Connected to the output of the fifth operational amplifier 150 is the first offset adjust means 34. The adjust means 34 includes a seventeenth resistor 162 which may have a value of 220 kΩ and an eighteenth resistor 164 which may have a value of 2.2 MΩ. One end of the resistor 162 is connected to one end of the resistor 164 at a third junction 166. The other end of the resistor 162 is connected to the output of the op-amp 150, whereas the other end of the resistor 164 is connected to the voltage V2.

The voltage-to-frequency converter means 32 continues the signal processing by connecting to the first offset adjust means 34. The converter means 32 includes a voltage-controlled oscillator (VCO) 168 such as an RCA 4046 VCO. The VCO 168 has an input which is connected to the third junction 166. The oscillator 168 outputs the unadjusted quantifiable signal 16 to the subsequently described second offset adjust means 40. The VCO 168 also includes an input 170 connected to the timing means 36 for receiving an inhibit signal therefrom.

Completing the elements shown in FIG. 2a are those contained within the monitoring means 4. The monitoring means 4 includes the low level detection member 38 which provides a low level detection indication by means of a sixth operational amplifier 172 having connections made thereto as shown in the Figure. The inverting input of the op-amp 172 is connected to the first junction 116 through a nineteenth resistor 174. The resistor 174 may have a value of 220 kΩ. Connected between the inverting input and the output of the op-amp 172 is a twentieth resistor 176 which may have a value of 2.2 MΩ. The non-inverting input of the op-amp 172 is connected to the second junction 124. Connected to the output of the operational amplifier 172 is one end of a fifth capacitor 178. This capacitor may have a value of 1000 pf. The other end of the capacitor 178 is connected to one end of a twenty-first resistor 180, which may have a value of 5.6 MΩ, and to one end of a twenty-second resistor 182, which may have a value of 6.4 MΩ, to form a fourth junction 184. The other end of the resistor 180 is connected to the voltage V2, whereas the other end of the resistor 182 is connected to the common 104. Extending from the junction 184 is a connection which provides the low level monitor signal used by the second offset adjust means 40.

Referring now to FIG. 2b, one will see the preferred-embodiment electronic components of the timing means 36. The timing means 36 includes a timing oscillator means 186 for providing a timing signal to control the operations of the present invention. In the preferred embodiment described herein the oscillator 186 provides a nominal 40 Hz. signal. The timing oscillator 186 includes a first logic gate means, a second logic gate means and a third logic gate means connected in series and having two resistors and a capacitor connected thereto. Specifically, the oscillator 186 includes a first inverter 188 having an output connected to the input of a second inverter 190 in turn having its output connected to the input of a third inverter 192. Connected to the input of the first inverter 188 is one end of a twenty-third resistor 194 which may have a value of 10 MΩ. Connected to the output of the second inverter 190 and the input of the third inverter 192 is one end of a sixth capacitor 196 which may have a value of 1400 pf. Connected to the output of the third inverter 192 is one end of a twenty-fourth resistor 198 which may have a value of 10 MΩ. The other ends of the resistor 194, the capacitor 196, and the resistor 198 are commonly connected.

Further included in the timing means 36 is a first frequency divider means such as a flip-flop 200. The flip-flop 200 may be a D-type Model RCA 4013. The output of the third inverter 192 of the oscillator means 186 is connected to the clock input of the flip-flop 200. The inverted output of the flip-flop 200 is connected to the D input thereof thereby causing the inverted output to have a frequency which is one-half that of the timing signal provided to the clock input. In addition to being connected to the D input, the inverted output of the flip-flop 200 is connected to the input of a second frequency divider means, such as a decade counter 202, and to the input of a fourth logic gate means, such as a first NAND gate 204.

The decade counter 202 receives the clocking signal from the flip-flop 200 and converts it into a plurality of distinct timing control signals. In the decade counter of the preferred embodiment, every group of ten consecutive cycles of the clock signal is converted into a series of 10 separate and distinct output timing signals. That is, the first cycle within a group of ten cycles activates one output of the counter 202 to provide a timing pulse which exists until the second cycle within the group of ten cycles causes a second output of the counter 202 to be activated to provide a second separate and distinct timing signal. In this way a series of ten output signals is provided from the counter 202. Of these ten signals, the preferred embodiment of the present invention utilizes four. Specifically, the first output signal (CT0), the second output signal (CT1), the third output signal (CT2), and the fifth output signal (CT4), are used. The uses of these specific signals are subsequently described herein.

One use for these signals is to connect the output providing the CT2 signal to an input of the first NAND gate 204. By having its inputs connected to the inverted output of the flip-flop 200 and the CT2 signal, the gate 204 provides an inhibit signal from its output to the inhibit terminal 170 of the voltage-controlled oscillator 168. This inhibit signal is present at all times except when the inverted output of the flip-flop 200 is in a high logic level and when the CT2 signal is also in a high logic state. In other words, the voltage-controlled oscillator 168 only functions during that portion of CT2 when the inverted output of the flip-flop 200 is in a high logic state.

In addition to showing the components of the timing means 36, the FIG. 2b schematic diagram shows the preferred components of the second offset adjust means 40. The adjust means 40 receives the electrical signals from the monitoring means 4 and from the voltage-to-frequency converter means 32. The monitoring means 4 signal is received by connecting the fourth junction 184 shown in FIG. 2a to the input of a fifth logic gate means such as a fourth inverter 206 shown in FIG. 2b. The output of the fourth inverter 206 is connected to an input of a first memory means such as the clock input of a second flip-flop 208. The flip-flop 208 may be a D-type model RCA 4013. The second flip-flop 208 has a D input which is connected to the voltage V2. The non-inverted output of the flip-flop 208 is connected to the D input of a second memory means such as a third flip-flop 210 which may also be a D-type RCA 4013. The non-inverted output of the flip-flop 208 is also connected to an input of a sixth logic gate means such as a second NAND gate 212. The inverted output of the flip-flop 208 is connected to an input of a seventh logic gate means such as a third NAND gate 214. The reset input of the flip-flop 208 is connected to the non-inverted output of the flip-flop 210. Further, the flip-flop 210 has its clock input connected to the CT2 output of the decade counter 202. The inverted output of the flip-flop 210 is connected to the other input of the third NAND gate 214. The output of the NAND gate 214 is connected to an input of a third memory means such as the set input of a fourth flip-flop 216. This flip-flop may also be a D-type RCA 4013. The reset input of the flip-flop 216 is connected to the CT1 output of the decade counter 202. The inverted output of the flip-flop 216 is connected to an input of an eighth logic gate means such as a fourth NAND gate 218.

The unadjusted quantifiable signal from the voltage-to-frequency converter means 32 is received by the second offset adjust means 40 by connecting the output of the voltage-controlled oscillator 168 to an input of a ninth logic gate means such as a fifth NAND gate 220.

The oscillator 168 output is also connected to an input of a tenth logic gate means such as a sixth NAND gate 222. The output of the NAND gate 220 is connected to an input of an eleventh logic gate means such as a fifth inverter 224. The output of the fifth inverter 224 is connected to a first counter means for receiving and adjusting the unadjusted quantifiable signal from the VCO 168.

In the preferred embodiment described herein this first counter means is an up/down counter 226 having a first input 228 to which the output of the fifth inverter 224 is connected. The counter 226 may be a type 74C193 having its count-down input used as the first input 228. The counter 226 also has a second input 230 having a plurality of ports for receiving an adjustment count which will be subsequently described. The counter 226 also has a load input to which is connected the CT1 output of the decade counter 202. An output signal is provided by the counter 226 through a first output 232 which may be the borrow output of the type 74C193 counter. This first output 232 is connected to another input of the fifth NAND gate 220. This output is also connected to the input of a twelfth logic gate means such as a sixth inverter 234.

The output of the inverter 234 is connected to another input of the sixth NAND gate 222. The output of the sixth NAND gate 222 is connected to an input of a thirteenth logic gate means such as a seventh NAND gate 236. Another input of the NAND gate 236 is connected to the output of the second NAND gate 212. The output of the seventh NAND gate 236 is connected to an input of a fourth memory means such as the clock input of a fifth flip-flop 238. The flip-flop 238 may be a D-type 4013. The D input of the fifth flip-flop is connected to the voltage V2. The non-inverted output of the flip-flop 238 is connected to an input of a fifth memory means such as the D input of a sixth flip-flop 240 of the D-type RCA 4013. The inverted output of the flip-flop 238 is connected to an input of a fourteenth logic gate means such as an eighth NAND gate 242. The reset input of the fifth flip-flop 238 is connected to the CT1 output of the decade counter 202. This same decade counter 202 output is also connected to the reset input of the sixth flip-flop 240. The flip-flop 240 also has a clock input which is connected to the output of the seventh NAND gate 236. The non-inverted output of the flip-flop 240 is connected to another input of the fourth NAND gate 218. Connected to another input of the fourth NAND gate 218 is the CT0 output of the decade counter 202. This same CT0 output is also connected to another input of the eighth NAND gate 242. The outputs of the fourth NAND gate 218 and the eighth NAND gate 242 are connected to a second counter means which is controlled to provide adjustment signals to the first counter means.

In the preferred embodiment this counter means is a second up/down counter 244 which may be of the type 74C193. The counter 244 has a first control input 246 to which the output of the fourth NAND gate 218 is connected. The input 246 is the count-up input of the type 74C193 counter. The counter 244 also has a second control input 248 to which the output of the eighth NAND gate 242 is connected. The input 248 is the count-down input of the type 74C193 counter. Additionally, the counter 244 has a second output 250 having a plurality of ports to output the adjustment count provided by the counter 244. These ports of the second output 250 are connected to respective input ports of the second input 230 of the first counter 226.

From the above description of the elements of the second offset adjustment means 40, it can be discerned that generally there are three main functional groups. These groups include a first counter means, a second counter means, and a control means. The control means includes the above-described logic gate means and memory means which receive control, or command, information via the electrical signals from the monitoring means 4, the first output 232, and the output of the voltage-controlled oscillator 168. This command information is appropriately processed by the logic and memory means to provide adjustment command output signals to the second counter means. These command output signals are provided by the outputs of the fourth NAND gate 218 and the eighth NAND gate 242. Through these command output signals the second counter means is controlled to provide appropriate adjustment count signals.

FIG. 2c shows a schematic illustration of the electronic components of the vibrator control means 48 and the vibrator connect means 50. The vibrator control circuit means 48 is used to set a tactile indicator means activation, or trigger, level which can be adjusted to any one of a plurality of discrete magnitudes determined by counter means under the control of level adjust timing means and level selection means.

The level adjust timing means includes a third frequency divider means such as a seventh flip-flop 252 of the D-type previously mentioned. The clock input of this flip-flop is connected to the CT0 output of the decade counter 202. The inverted output of the flip-flop 252 is connected to the D input thereof to obtain the frequency division. The inverted output is also connected to a sixth memory means such as an eighth flip-flop 254, a seventh memory means such as a ninth flip-flop 256, and an eighth memory means such as a tenth flip-flop 258. The inverted output of the flip-flop 252 is further connected to the clock inputs of a fourth frequency divider means such as an eleventh flip-flop 260. As with the flip-flop 252, the flip-flops 254–260 may be of the previously identified D-type. Additionally, the inverted output of the flip-flop 252 is connected to the input of a fifteenth logic gate means such as a seventh inverter 263 and to an input of a sixteenth logic gate means such as a ninth NAND gate 264. The flip-flop 260 has its D input connected to its inverted output. The inverted output is further connected to the clock input of a fifth frequency divider means such as a twelfth flip-flop 262 of the D-type. Flip-flop 262 has its inverted output connected to its D input and its non-inverted output connected to an input of a reset control means such as a NAND gate 265. The other input of the gate 265 is connected to the output of the inverter 263.

The level selection means includes a first switch means 266 having a first pole 268 and a second pole 270. The first pole 268 is connected to the voltage V2. The second pole 270 is connected to the common 104 through a twenty-third resistor 272 which may have a value of 2.7 MΩ. The pole 270 is further connected to the input of a seventeenth logic gate means such as an eighth inverter 274 for providing a select enable (SEL ENB) control signal which will be further described in the discussion of FIG. 2d. The pole 270 is also connected to an input of the ninth NAND gate 264 and to the D input of the eighth flip-flop 254.

Serving a debounce function to the switch 266 and timing and memory functions to other components of the invention are the flip-flops 254, 256 and 258. As previously stated, the clock inputs of these flip-flops are connected to the inverted output of the flip-flop 252. Further, the D input of the flip-flop 254 has been stated to be connected to the second pole 270 of the switch 266. The flip-flop 254 also has a non-inverted output which is connected to the D input of the flip-flop 256. The inverted output of the flip-flop 254 is connected to the reset input of the flip-flop 258 and also to an input of an eighteenth logic gate means such as a tenth NAND gate 276. The flip-flop 256 has a non-inverted output which is connected to the clear input of a third up/down counter 278 and a fourth up/down counter 280. The non-inverted output of the flip-flop 256 also provides a vibrator reset (VBR) control signal to the display selector means 44 subsequently described hereinbelow. The flip-flop 256 has an inverted output which is connected to an input of a nineteenth logic gate means such as an eleventh NAND gate 282. This NAND gate 282 has its output connected to the D input of the flip-flop 258. The flip-flop 258 has its inverted output connected to an input of the NAND gate 282. The flip-flop 258 also has a non-inverted output which is connected to the reset input of the flip-flop 256 and to an input of the NAND gate 264.

It is through the previously mentioned connections to the NAND gate 264 that the counter means of the vibrator control circuit means 48 are adjusted to select a specific vibrator trigger level. The output of this NAND gate 264 is connected to an input of a twentieth logic gate means such as a twelfth NAND gate 284. The output of the NAND gate 284 is connected to an input of the counter 278. In the preferred embodiment the counter 278, as well as the counter 280, is a type 74C193 counter having a count-up input to which the output of the NAND gate 284 is connected. The output of the NAND gate 284 also provides a vibrator trigger level (VTL) signal to the display selector means 44 which will be further described with reference to FIG. 2d.

The counter 278 is serially connected to the counter 280 between the carry output and the count-up input, respectively. These serially connected counters construct a variable counter means which is controllable to provide the desired trigger level for the tactile indicator means. Using the preferred embodiment type 74C193 counter, eight output ports representing the binary digit positions from $2^0$ to $2^7$ are provided. These eight ports are the means by which a total of 128 counts may be provided. However, in the preferred embodiment only counts 0–63 (i.e., 64 discrete counts) are used. This limitation is accomplished by connecting the $2^6$ output port from the counter 280 to the input of a twenty-first logic gate means such as an inverter 286 which in turn has its output connected to an input of the NAND gate 284. Using this connection from the $2^6$ port to the NAND gate 284, an inhibit control signal is provided to prevent the variable counter means from generating more than a total of sixty-four discrete trigger levels.

To determine if the trigger level has been exceeded, thus indicating that the tactile indicator means should be activated, the trigger level count provided by the variable counter means must be compared to the adjusted quantifiable signal representing the detected sound intensity. To make this comparison, the count provided by the output ports of the counters 278 and 280 is loaded into a storage counter means. Specifically, the count outputs of the counter 278 are connected to the data inputs of a fifth up/down counter 288 and the count outputs of the counter 280 are connected to the data inputs of a sixth up/down counter 290. The counters 288 and 290 are similarly of the type 74C193 and are serially connected by connecting the borrow output of the counter 288 to the count-down input of the counter 290. The trigger level count generated by the level set counters 278 and 280 is loaded into the storage counters 288 and 290 under control of the CT4 output of the decade counter 202. This is done by connecting the CT4 output to the input of a twenty-second logic gate means such as a tenth inverter 292, and connecting the output of the inverter 292 to the load inputs of both counters 288 and 290. The output of the inverter 292 is also connected to an input of a ninth memory means such as the clock input of a thirteenth flip-flop 294 of the previously mentioned D-type. Once the appropriate trigger level has been loaded into the counters 288 and 290, this level is compared to the quantity of adjusted quantifiable signals by connecting a binary count signal (BCNT) from the display selector means 44 to the count-down input of the fifth counter 288.

When the binary count signal exceeds the stored trigger level, an appropriate indicator signal is provided by the borrow output of the counter 290. This borrow output is connected to the D input of the flip-flop 294 and also to the input of a twenty-third logic gate means such as an eleventh inverter 296. The output of the inverter 296 is connected to an input of the NAND gate 276 to which the inverted output of the flip-flop 254 is also connected. Also connected to the input of the NAND gate 276 is the non-inverted output of the flip-flop 294. The combination of these three input signals to the NAND gate 276 and the NANDING thereof by the gate 276 provides, when of the appropriate logic levels, a latch set signal to a tenth memory means such as the one shown in FIG. 2c. This memory means comprises a twenty-fourth logic gate means such as a thirteenth NAND gate 298 and a twenty-fifth logic gate means such as a fourteenth NAND gate 300. The output of the NAND gate 276 is connected to an input of the NAND gate 298. Another input of the NAND gate 298 is connected to the output of the NAND gate 300. The NAND gate 298 output is connected to an input of the NAND gate 300 and also to an input of twenty-sixth logic gate means such as a fifteenth NAND gate 302. The other input of the NAND gate 300 is connected to the output of the NAND gate 265 for the purpose of receiving a signal to reset the tenth memory means.

In addition to being connected to the NAND gate 298, the NAND gate 302 has an input connected to the non-inverted output of an eleventh memory means such as a fourteenth flip-flop 304. The preferred embodiment D-type flip-flop 304 has its D and clock inputs connected to the common 104. The flip-flop 304 has its set input connected to the CT2 output of the decade counter 202 and its reset input connected to the CT4 output of the decade counter 202. Being connected in this manner, the flip-flop 304 provides an intermittent signal for duty-cycling the tactile indicator means to thereby conserve the power supply 10. This duty-cycling function is provided to the tactile indicator means by connecting the output of the NAND gate 302 to the input of a twenty-seventh logic gate means such as a twelfth inverter 306. The output of the inverter 306 provides the interface connection to the vibrator connect means 50.

The vibrator connect means 50 comprises, in the preferred embodiment, a connector means 308 such as an RCA 4066B electronic switch. The connector means 308 includes a first contact 310 which is connected through an appropriately sized twenty-fourth resistor 312 to the voltage V2. The connector means 308 also includes a second contact 314 which is connected to the common 104 through an appropriately sized twenty-fifth resistor 316. The second contact 314 is also connected to the tactile indicator means. The contacts 310 and 314 are normally opened, but are closed when a signal having the appropriate logic level is received by the connector 308 from the inverter 306 which is connected to the activation input of the connector 308. When the connector means 308 is activated to close the contact 314 against the contact 310, the tactile indicator means is activated. In the preferred embodiment the tactile indicator means is a vibrator which is disposed in the sound level indicator for physical contact with a person using the indicator.

Referring now to FIG. 2d, the schematic diagrams for the electronic components of the display selector means 44 and the display driver means 46 are shown. Also shown in FIG. 2d is a schematic representation of a monolithic watch chip circuit which is associated with the sound level indicator to provide date and time of day functions.

The display selector means 44 is controlled to provide the appropriate information to be visually displayed. The selection control signal is provided by the select enable signal from the inverter 274 shown in FIG. 2c. The output of the inverter 274 is connected to a twenty-eighth logic gate means such as a first AND gate 318 and to a twenty-ninth logic gate means such as a second AND gate 320. The inverter 274 output is also connected to the input of a thirtieth logic gate means such as a thirteenth inverter 322. The inverter 322 output is connected to an input of a thirty-first logic gate means such as a third AND gate 324 and to a thirty-second logic gate means such as a fourth AND gate 326.

So that the level of the detected sound intensity may be displayed, the adjusted quantifiable signal 42 is propagated to the display selector means 44 by connecting the output of the NAND gate 236 to another input of the first AND gate 318. So that the vibrator trigger level may be displayed, the vibrator trigger level from the vibrator control means 48 is provided to the display selector means 44 by connecting the output of the NAND gate 284 to another input of the third AND gate 324. Additional connections within the display selector means 44 include connecting the CT4 output of the decade counter 202 to another input of the second AND gate 320. Also the vibrator reset signal from the vibrator control means 48 is provided to the display selector means 44 by connecting the non-inverted output of the flip-flop 256 to another input of the fourth AND gate 326.

The outputs of the first AND gate 318 and the third AND gate 324 are connected to respective inputs of a thirty-third logic gate means such as a first OR gate 328. Similarly, the outputs of the second AND gate 320 and fourth AND gate 326 are connected to respective inputs of a thirty-fourth logic gate means such as a second OR gate 330. The outputs of the OR gates 328 and 330 are connected to elements within the display driver means 46. Additionally, the output of the first OR gate 328 is connected to the count-down input of the counter 288 to provide the binary count signal thereto.

Once the appropriate signal to be displayed has been selected (as subsequently described), the selected signal must be converted into appropriate electrical signals for activating the visual display. This is done by means of the display driver means 46 which includes a code converter means as a binary to binary-coded decimal counter 332 of the RCA 4518B type. The count input of the counter 332 is connected to the output of the OR gate 328. The reset input of the counter 332 is connected to the output of the OR gate 330. The counter 332 converts the serially received adjusted quantifiable signal into a quantified number represented by a plurality of parallel outputs having appropriate high or low logic levels thereon. These outputs are connected to the inputs of a driver means such as a binary-coded-decimal to 7-segment display driver 334 and a binary-coded-decimal to 7-segment display driver 336. The drivers 334 and 336 may be of the RCA 4543 type. The logic levels received at these driver inputs are latched into the drivers 334 and 336 upon receipt of the appropriate signal at the latch input of the drivers 334 and 336. This latch signal is provided by connecting the CT2 output of the decade counter 202 to the latch input of the drivers 334 and 336. Upon latching of the input signals, the drivers provide appropriate outputs to activate the visual displays for displaying either the sound intensity level or the vibrator trigger level, depending upon the logic state of the select enable pulse previously mentioned. Also connected to the drivers 334 and 336 and to the back plane of the display means is a phase signal provided by a clock chip 338. This phase signal interconnection insures electrical compatibility among the drivers 334 and 336, the clock chip 338 and the display means to permit a single display to be used by both the sound level indicator and the clock.

The clock chip 338 is connected in the manner which is known in the art. Included in these connections are a first set switch 340 having one pole connected to the voltage V2 and the other pole connected to the cycle input of the clock chip 338. Also connected to the chip 338 is one pole of a second set switch 342 which has another pole connected to the voltage V2. Further connected to the clock chip 338 is a watch crystal 344 and a variable capacitor 346. In the preferred embodiment the watch chip 338 is a National Semiconductor MM58129 device. The preferred embodiment of the watch crystal 344 is a Statek WX-7 crystal.

In concluding the structural discussion with respect to FIGS. 2a–2d, it is to be noted that the above discussion has indicated a variety of electronic components which have been indicated as single entities or a number of individual monolithic microcircuit chips. However, in the preferred embodiment contemplated by Applicant, these electronic components, although often identified as being separate entities, are physically contained within six integrated circuit chips. This number includes two operational amplifier chips, each having three operational amplifiers therein. For example, these could be Siliconix L144 operational amplifiers. A third chip is the voltage-controlled oscillator chip which was indicated to be of the RCA 4046 type. These three chips, along with the resistors and capacitors previously described to be associated therewith, contain those functional elements shown in FIG. 2a.

A fourth chip is the electronic switch chip previously mentioned to be of the RCA 4066B type. This basically provides the vibrator connect means 50 shown in FIG. 2c.

A fifth integrated circuit chip is the watch clock chip mentioned to be of the National Semiconductor MM58129 type. This chip provides the function of the clock shown in FIG. 2d.

A sixth chip is a custom CMOS chip which provides the functions of the timing means 36, the second offset adjust means 40, the vibrator control means 48, the display selector means 44, and the display driver means 46 as shown in FIGS. 2b, 2c and 2d.

By using such packing techniques to obtain the previously described connections, one obtains a sound level indicator which is so compact that it can be worn on a user's wrist. A preferred embodiment of the exterior of such a compact sound level indicator is depicted in FIG. 3. The sound level indicator of FIG. 3 includes a case 400 for containing the electronic components of the sound level indicator. Attached to the case 400 is a retaining strap, or wrist band, 402. Also associated with the base 400 is a covering 404 overlaying the microphone 106 used to detect the presence of sound pressure waves. Further associated with the case 400 are the switches 266, 340 and 342 which extend outwardly from the case 400 so that they can be manipulated by the user of the sound level indicator.

Additionally associated with the case 400 is a display 406 such as a six-digit liquid crystal display. The first four of these digits (those constituting the group of larger digits shown in FIG. 3) are activated by the clock chip to display the hours and minutes or the month and date or the seconds. The remaining two digits (those constituting the group of smaller digits shown in FIG. 3) are activated by the display drivers 334 and 336 to indicate either the sound level intensity or the vibrator trigger level, depending upon which item has been selected to be displayed by the select enable signal.

Still further associated with the case 400 is a tactile indicator means such as a vibrator 408 mounted within the case 400 for external extension from the rear thereof for physically contacting the wrist of the user of the sound level indicator. Because the vibrator is activated to extend from the rear of the case 400 and not from the front thereof, the tactile indicator means 408 is shown in phantom in FIG. 3.

With reference again to FIGS. 2a–2d, the operation of the sound level indicator will be described. The general function of the sound level indicator is to detect the presence of sound pressure waves which occur within the proximity of an individual wearing the device. The device is constructed so that the detection will occur within syllabic time periods, as opposed to the longer cumulative time periods proposed in the prior art related to noise detection. This shorter time period is achieved by continuously monitoring for the presence of sound waves and by periodically measuring those detected electrical signals which are above a predetermined level. The specific time periods, detection levels and other operation characteristics of the sound level indicator depend on the particular combination of components actually used to construct the sound level indicator.

In the preferred embodiment shown in FIGS. 2a–2d, the nominal monitoring time period is 0.5 second. This is obtained from the timing means 36. The output of the inverter 192, in association with the inverters 188 and 190, and the resistors 194 and 198, and the capacitor 196, provides a timing signal having a nominal frequency of 40 Hz. This 40 Hz timing signal is divided into a nominal 20 Hz signal by the flip-flop 200. The 20

Hz signal drives the decade counter 202 which, for every ten consecutive cycles of the 20 Hz driving signal, provides 10 separate and distinct control timing signals. In this way a group of ten control signals is repeated every 0.5 second which gives this preferred embodiment of the sound level indicator its basic time period of 0.5 second.

In particular, within a group of ten consecutive cycles of the 20 Hz driving signal, the first cycle is detected by the counter 202 and thereby activates an output CT0 having an activation period of approximately 0.05 second. Likewise, the second cycle of the driving signal is detected and thereby causes the CT0 output to deactivate and the CT1 output to activate for the 0.05-second activation period. Subsequent cycles are similarly detected and converted into control signals. When the eleventh cycle is detected the process is repeated so that the eleventh cycle activates the CT0 output and so on. Thus, within each 0.5-second basic time period there are ten control signals provided, each having an approximately 0.05-second activation period and each activation period occurring during a different portion of the overall 0.5-second basic time period.

While this timing process is occurring, the signal processing portion of the sound level indicator is operating. The receiver means 18 detects the presence of sound pressure waves and converts them into proportionate electrical signals such as alternating voltage signals. These electrical signals are identified as the primary electrical signal 20 in FIG. 1.

The electrical signals are appropriately conditioned and amplified by the first amplifier means 22 and the second amplifier means 24. The specific degree of amplification depends on the specific values of the components connected to the operational amplifiers 110 and 126 shown in FIG. 2a. Indeed, the specific component values used throughout the sound level indicator establish a predetermined level below which sound level measurements do not occur. The amplified signals are coupled to the rectifier means 26 for half-wave rectification thereby. This rectification occurs at a voltage reference level which is provided by the reference means 30. Again the specific level at which the rectification occurs depends upon the component values actually used, however, the reference level used is preferred to be one having a sufficient magnitude to enable the operational amplifiers to function in their linear ranges.

Next, the half-wave rectified signals are supplied to the averaging means 28. The averaging means 28 functions to average these signals into a signal having a magnitude which is an average of the rectified signals. In the preferred embodiment shown in FIG. 2a, the resistor 158 and the capacitor 160 operate to create a low-pass average. When the resistor 158 and the capacitor 160 have resistive and capacitive values as described above, this results in an RC time constant of approximately 0.5 seconds. It will be noted that this time constant is approximately equivalent to the basic time period provided by the timing means 36. This approximate equivalency is desirable to prevent large changes in the measured value between successive basic time periods. Also, because the display is updated every 0.5 second under control of the basic time period, this approximate equivalency prevents large changes in the displayed quantity.

The averaged signal is processed by the operational amplifier 150 is provide a voltage level which corresponds to the particularly detected sound waves. This voltage level from the output of the operational amplifier 150 wil be labeled $E_o$ for purposes of further discussion. $E_o$ is added to a voltage level which is provided by the first offset adjust means 34. The resultant summed voltage level will be labeled $E_i$ for purposes of further discussion. The value of $E_i$ represents the magnitude of the voltage between the common 104 and the junction 166.

This summed result, $E_i$, is input into the voltage-to-frequency converter means 32. When the converter means 32 is not inhibited by the inhibit signal previously described, this summed input voltage causes the converter means to provide an output of alternating electrical signals having a number of cycles proportionate to the voltage level input. It is this output which has been previously referred to as the unadjusted quantifiable signal 16 shown in FIG. 1. As mentioned, this output is only provided when the converter means 32 is not inhibited by the inhibit signal provided by the timing means 36. In the preferred embodiment, the converter means 32 is not inhibited only during the period when the CT2 output of the counter 202 and the inverted output of the flip-flop 200 are simultaneously in their activated states. Specifically this period is when both are at high logic levels. Thus, this inhibit signal duty cycles the converter means 32 to be operational only for a nominal period of 0.025 second during each 0.5-second basic time period. This duty-cycling reduces the drain on the power supply and thereby permits the use of a more compact power supply.

In performing the above-described signal processing operations, the sound level indicator uses analog electronic components which have intrinsic parametric variations. Also the power supply in the preferred embodiment of the sound level indicator comprises two batteries which by their nature provide voltage levels which decrease with time and use. Therefore, without some type of adjustment means the processing of identical sound waves would result in different measurements as the components and power supply vary. To maintain the measurement of identical sound level intensities constant over battery voltage and component variations, the adjustment means 6 is used in the sound level indicator. In particular the adjustment means 6 includes the first offset adjust means 34 and the second offset adjust means 40.

The first offset adjust means 34 includes, in the preferred embodiment, the resistors 162 and 164. These resistors cooperate with the amplifier 150 and the reference means 30 to insure that none of the dynamic range of the linear amplifier is sacrificed. In particular, the dynamic range is limited by the amplifier 150. So that the maximum output signal variation can be obtained for $E_o$, the voltage level provided by the reference means 30 must be as low as possible, yet still allow the circuit to operate in its linear region. Such a reference level is achieved by using the components shown in FIG. 2a to construct the reference means 30.

Although the maximum voltage swing is obtained from the amplifier 150 by using this reference technique, the input activation voltage of the voltage-controlled oscillator 168 may be greater than the values of $E_o$ output by the amplifier 150. Therefore, the amplifier output $E_o$ must be increased to insure that the voltage-controlled oscillator 168 is operating in its linear region, regardless of the specific operating parameters of a particular VC0 that may be used. This increase in $E_o$ is accomplished by using the voltage V2 and dividing it down by resistors 162 and 164 to provide an appropriate offset voltage. Thus, by using the reference means 30, the amplifier 150, the resistors 152, 154, 156, 162 and 164, and the voltage-controlled oscillator 168, the input voltage, $E_i$, supplied to the voltage-controlled oscillator 168 is:

$$E_i = (E_o R_{164} + V2\ R_{162})/(R_{164} + R_{162}) \approx E_o + V2\ R_{162}/R_{164}$$
$$\text{for } R_{164} >> R_{162}.$$

Because V2 is a battery in the preferred embodiment and thus provides a voltage level which decays with time and because each voltage-controlled oscillator 168 has a slightly different offset voltage, $E_i$ is initially set high enough to insure at least two cycles of output from the voltage-controlled oscillator 168 when $E_o$ is at a minimum level, i.e., when there is no detected sound. This offset output which occurs when no sound is detected is corrected by the second offset adjust means 40.

Referring now to FIG. 2b, the operation of the second offset adjust means 40 will be described. In describing the function of this portion of the sound level indicator it is assumed that the device is in a quiet environment, that is there is no sound so $E_o = E_{omin}$. Therefore, the output from the voltage-controlled osccillator 168 is that number of pulses which is generated by the minimum voltage provided by the first offset adjust means 34. For purposes of the following explanation it is assumed that this output is two pulses.

A further assumption is that the sound level indicator has just been activated so that, without any initialization process which could be added to the sound level indicator but which is not indicated in the schematic diagrams of FIGS. 2a–2d, some number M is stored in the counter 244. This number M could be any number from $0000_2$ to $1111_2$ depending upon what transient voltages the counter 244 detects upon energization.

Still further it is assumed that upon energization the non-inverted (Q) outputs of the flip-flops 208, 210, 216, 238 and 240 are 0 (low logic levels). Thus, the inverted ($\overline{Q}$) outputs of these flip-flops are assumed to be 1 (high logic levels). These logic states do not necessarily result upon energization, but for simplification of explanation they will be assumed to be at these levels.

It is also assumed that the borrow output 232 of the counter 226 is initially at a high logic level. One final assumption is that the first timing control signal to be provided to the circuit is the CT0 output.

When the CT0 output is activated into a high logic state, the count-down input 248 of the counter 244 has a low logic level applied thereto as a result of the NANDING by the NAND gate 242 of the CT0 signal and the high logic level from the $\overline{Q}$ output of the flip-flop 238. When the CT0 output returns to a low logic level after the approximately 0.05-second duration of its activated state, the count-down input 248 of the counter 244 detects a logic level shift from low to high and thus decrements the original count contained in the counter 244 to a new count M. Under the above assumptions, the CT0 signal does not also activate the input 246 of the counter 244 because the low level of the Q output of the flip-flop 240 prevents the detection of the change in the logic level of the CT0 signal.

Next, the CT1 control timing signal is activated into a high logic state. This signal is used to reset the flip-flops 216, 238 and 240 so that the Q outputs thereof are at low logic levels and the $\overline{Q}$ outputs are at high logic levels. Also during this count, this signal activates the counter 226 to load the count from the counter 244 into the counter 226.

Upon the expiration of the CT1 signal, the CT2 signal is activated into a high logic level. The control signal CT2 clocks the flip-flop 210 to store the Q output of the flip-flop 208. Under the above assumption this merely retains the Q output of the flip-flop 210 at 0. Also, upon the activation of the CT2 signal, the voltage-controlled oscillator 168 is activated so that the previously assumed two pulses are serially propagated to an input of the NAND gate 220. Because the borrow output 232 of the counter 226 is assumed to be 1, these two pulses propagate through the NAND gate 220 and the inverter 224 for application to the count-down input 228 of the counter 226. Also from the FIG. 2b schematic it is seen that the two pulses are applied to an input of the NAND gate 222. However, these pulses do not propagate through the NAND gate 222 because the other input is at a low logic level as a result of the high logic level of the borrow output 232.

Upon application of the pulses at the count-down input 228, the counter 226 decrements the count M previously stored therein. In this way the unadjusted quantifiable signal from the voltage-controlled oscillator 168 is adjusted over a period of time. For example, it was assumed that when no sound was detected the voltage-controlled oscillator 168 provided an output of two pulses when in fact the output should have been 0 pulses. Thus, if count M were greater than or equal to 2 ($0010_2$), the subtraction performed by the counter 226 would not result in a borrow signal being generated by the counter 226. As a result, the second offset adjust means 40 would function as previously described and continue to decrement the counter 244 until the number M were adjusted so that the subtraction process resulted in a borrow signal being generated by the counter 226. Thus, under our above assumptions if M were decremented until M=1 ($0001_2$), then the first pulse of the two pulses from the VC0 output would decrement the contents of counter 226 to 0 ($0000_2$) and thereby activate the borrow output 232 to a low logic level which would in turn activate the NAND gate 222. With the NAND gate 222 activated, the second pulse from the VC0 output would propagate through this gate and through the NAND gate 236 which is also activated due to the low logic level of the CT1 output applied to the other input of the NAND gate 212. This pulse which propagates through the NAND gate 236 clocks the flip-flop 238 to provide a high logic level on the Q output thereof and also clocks the flip-flop 240 to store the previous low logic level of the flip-flop 238 Q output. This pulse is also provided to the display selector means. Thus by tracing the logic it will be seen that when the number of pulses provided by the voltage-controlled oscillator 168 is one more than the number M, the flip-flops 238 and 240 will be clocked to provide inhibiting signals to the count-up and count-down inputs of the counter 244. Therefore, when the offset adjust means 40 has automatically compensated its internal count M, a count of 1 is provided to the display when no sound is detected.

The above description was directed to the process of decrementing the counter 244 to arrive at an appropriate value of M. However, by tracing through the logic it will also be observed that an incrementing automatic adjustment to the count M occurs if M is two (under the assumption that two pulses are generated by the VC0 in a quiet environment) or more less than the number of pulses from the VC0 output. For example, if M=0 under the previous assumptions, the borrow output 232 initially activates the gate 222 so that both pulses from the VC0 output propagate through the gates 222 and 236. This provides two successive clock signals to the flip-flops 238 and 240. This double clocking retains the Q output of the 238 flip-flop in a high logic level, but it also clocks the flip-flop 240 to have a high logic level on its Q output. Thus, this high Q output of flip-flop 240 enables the gate 218 to propagate the next CT0 control timing signal to thereby increment the count M contained in the counter 244. This automatic adjustment occurs until M is 1 less than the number of pulses provided by the VC0 under quiet environment conditions.

Occurring at the same time as the signal processing and offset adjustment operations is the monitoring operation of the monitoring means 4. This monitoring is done to determine if the detected sound is below a predetermined level. The specific predetermined level is established by the specific components used within the monitoring means 4. In the preferred embodiment this level is to be established to permit the monitoring means 4 to detect when the monitored signal is below the linear resolution of the voltage-controlled oscillator 168. When such a signal is detected, a flashing indication is provided as subsequently described herein.

To perform this monitoring operation, the signal from the first amplifier means 22 is amplified by the high gain operational amplifier 172. This amplification results in an output signal which is coupled to a voltage divider. The effect of this coupling is to add the magnitude of the amplified signal to the voltage level provided by the voltage divider comprising the resistors 180 and 182. Thus, if the magnitude of the monitored signal is below the detection threshold level of the amplifier 172 (e.g., a quiet environment), then the summed voltage magnitude is simply the value of the voltage established by the resistors 180 and 182. In the preferred embodiment, this voltage is established to be in the range of a high logic level voltage. Once the amplifier threshold level is passed, however, the fixed voltage level provided by the resistors 180 and 182 is modified by having added thereto the magnitude of the alternating electrical signal from the output of the operational amplifier 172. It is to be noted that when the alternating signal has a sufficiently negative magnitude, the resultant summed voltage is in the range of a low logic level.

The voltage derived from this operation is connected to the inverter 206. The output of the inverter 206 is connected to the clock input of the flip-flop 208. From these connections and the previous discussion concerning the logic levels of the monitoring means output, it will be observed that the Q output of the flip-flop 208 remains at a low logic level until a sufficient sound level is detected by the low level monitor to cause the added voltages output therefrom to enter a low logic level. As previously mentioned, the sound level sufficient to do this is predetermined to be below that sound level which permits the oscillator 168 to operate in its linear range.

Once this lower sound level has been detected, the flip-flop 208 provides a signal which intermittently changes the value visually displayed by the visual display means. To further describe this alternating operation, reference is made to the assumptions and discussion regarding the operation of the offset adjust means 40. It is further assumed that the automatic adjustment has already taken place so that the proper value of M is stored in the appropriate counters. In discussing the effect the low level monitor has on the visual indicator, three additional assumptions must be individually considered.

First, it is assumed that no sound is present because of a quiet environment. Under this assumption the Q output of the flip-flop 208 remains 0 so no clocking signal is propagated through the gates 212 and 236 to the counter 332 during CT1, the activation signal of the gate 212. Therefore, during the period of CT2, the activation signal of the voltage-controlled oscillator 168, a count of 1 is propagated to increment the counter 332. This single count in the counter 332 is continuously displayed by the visual display means as long as the quiet environment exists.

Once the quiet environment ceases to exist, the second and third assumptions are to be considered. The second assumption provides that the sound has a magnitude which is below the linear resolution of the VC0 168, but is above the threshold of the op-amp 172 of the monitoring means 4. Under this assumption, the Q output of the flip-flop 208 is initially clocked to have a high logic level. During CT1, this level propagates to increment the counter 332 to thereby have an internal count of 1 (the counter 332 was cleared during the previous CT4 period). During CT2, the VC0 168 is activated to also propagate a count of 1 to the counter 332 since the linear region of the VC0 has not yet been reached by the detected sound. Also during CT2, the flip-flop 210 is clocked to latch a high logic level at its Q output. This high level resets the Q output of the flip-flop 208 to a low logic level. Therefore, during this first 0.5-second basic time period, the visual indicator means displays a count of "2". However, because the flip-flop 208 is reset during CT1 of the next 0.5-second period, only the "1" propagated by the VC0 168 is displayed during the next period. However, during the third 0.5-second period, the flip-flop 208 can again propagate a "1" and thereby cause a "2" to be displayed. Propagation of a "1" is again allowed during the third period because the Q output of the flip-flop 210 went to a low logic level during the second period. In this way the low level monitor causes the visual indicator to intermittently flash between "1" and "2" to alert the user of the sound level indicator that a sound which is below the linear resolution of the device is present.

Under the third assumption, a similar alternating display is obtained. The third assumption is that the detected sound is within the linear range of the device. In this situation the display alternates between the magnitude of the adjusted quantifiable signal and that magnitude plus the 1 count which results from the low level monitor 4 and the flip-flops 208 and 210 of the second offset adjust means 40.

When the flip-flop 208 provides a high logic level which propagates to the counter 332, it will be noted that this does not clock the flip-flops 238 and 240 because this propagation occurs during the same time that the CT1 signal is resetting these flip-flops. Furthermore, when the flip-flops 208 and 210 detect the presence of a signal indicating there is sound present, the Q outputs of the flip-flops 208 and 210 are NANDED to provide a set signal to the flip-flop 216 to thereby inhibit the NAND gate 218. This prevents the counter 244 from incrementing the count M as long as sound is detected by the low level monitor. Therefore, upon energization of the sound level indicator, the displayed data may be in error until a quiet environment is encountered to allow the second offset adjust means 40 to automatically adjust itself and the displayed count. However, because the adjustment process occurs every 0.5 seconds and because the maximum deviation from the four-output counter 244 is only a count of 16, a quiet environment need only be encountered for approximately 8 seconds.

Having described what sound level signals are to be displayed, an explanation of how they are displayed is now appropriate. When the previously mentioned select enable signal is in a high logic level, the adjusted quantifiable signal and low level monitor signal are permitted to pass through the logic gate 318 and the OR gate 328 to activate the binary to binary-coded-decimal counter 332 contained within the display driver means 46. The counter 332 counts the number of pulses contained within these signals thereby quantifying the signals into a displayable measurement. Once this measurement is obtained, the counter 332 outputs the measurement to the display drivers 334 and 336. This count is latched into the drivers under the control of the CT2 control timing signal to provide a constant display during the 0.5-second time interval between display updates. If the select enable signal is in a low logic state, then the vibrator trigger level is displayed by propagating the trigger level count through the AND gate 324 and on through the OR gate 328 to the counter 332. Regardless of which state the select enable signal is in, the signal propagated through the gate 328 provides the binary count signal to the vibrator control means 48.

In addition to controlling which information to display, the select enable signal determines which control signal resets the counter 332. If in the high logic level, the enable signal allows the CT4 control timing signal to reset the counter 332. If in the low state, the enable signal allows the vibrator reset signal to reset the counter 332.

Referring now to FIG. 2c, the operation of the vibrator control means 48 will be described. In the preferred embodiment, the vibrator control means 48 is under the control of the switch 266 and the flip-flop 252. The switch 266 is activated by the user of the sound level indicator to set the desired trigger level at which the vibrator 408 will activate. Upon activation of the switch 266, the select enable signal goes to a low logic state thus selecting the display and reset signals as described above. The switch 266 activation also provides high logic level inputs to the flip-flop 254 and the NAND gate 264. These high levels activate the remainder of the vibrator control means 48 in conjunction with the timing signals provided by the flip-flop 252.

The flip-flop 252 is clocked by the CT0 timing signal so that a 1 Hz signal is output to the vibrator control means 48. Specifically, this output clocks the flip-flops 254, 256, 258 and 260. The output also provides activation signals to the counter 278, the reset control NAND gate 265, and the flip-flop 262 through various intermediate gates.

The flip-flop 252 timing signal causes the high logic level from the activated switch 266 to propagate through the flip-flops 254–258. When the high level reaches the Q output of the flip-flop 256, the high output clears the outputs of the counters 278 and 280 to zero. This high output is also the vibrator reset signal used to reset the counter 332. When the high level reaches the output of the flip-flop 258, the NAND gate 264 propagates the flip-flop 252 timing signal to the gate 284 which in turn propagates the signal to the counter 278 count-up input. In this manner, the vibrator trigger level is obtained by having the counters 278 and 280 incremented until either the switch 266 is deactivated or the count of 64 ($1000000_2$) is reached. The count of 64 is the limit because of $2^6$ output of the counters 278 and 280 is inverted through the inverter 286 then connected to the NAND gate 284 to thereby inhibit the gate 284 when the $2^6$ output is at a high logic level. The count signal from the output of the gate 284 is also the vibrator trigger level signal which is provided to the display control means 44.

Once a count level has been achieved in the counters 278 and 280, this count is loaded into the counters 288 and 290 under the control of the CT4 timing control signal. Each time the trigger level is loaded into the counters 288 and 290, the level is decremented by the binary count signal received from the display control 44. This binary count signal is the count representing the detected sound intensity level. Thus, when the binary count signal decrements the stored count to zero, the trigger level has been reached. Upon reaching zero, the borrow output of the counter 290 goes to a low logic level and activates the NAND latch comprising the flip-flops 298 and 300. It is to be noted from the FIG. 2c schematic that if the trigger level is set at zero, the flip-flop 294 will inhibit the NAND from being activated.

The setting of the NAND latch to a high logic level output from the NAND gate 298 provides an activation signal to the NAND gate 302. During this activation period of the gate 302, the Q output of the flip-flop 304 propagates through the gates 302 and 306 to the vibrator connect means 50. Specifically, a high logic level propagates to the connect means 50 during the CT2 and CT3 control timing signal activation periods because the CT2 signal sets the flip-flop 304 Q output to a high level. Once the CT4 control timing signal goes high, however, the Q output goes low. Thus, while the output of the NAND gate 298 is high, the vibrator is activated through the vibrator connect means 50 for two out of the ten control timing signals. In other words, the vibrator is duty-cycled to vibrate 0.1 second out of every 0.5-second basic timing period during which the NAND latch is set. It will be noted upon examination of FIG. 2c that the NAND latch remains set until the timing signal from the flip-flop 252 can propagate through the flip-flops 260 and 262 and be logically combined with the inverted timing signal from the inverter 263 in the NAND gate 265.

The preferred method of indicating sound levels includes the steps of performing the previously described functions. In general this includes processing the detected sound waves into electrical signals, adjusting these signals to compensate for variations in the electrical components, monitoring the signals for detecting magnitudes below a predetermined level and for providing a low level indicating signal when such magnitudes are detected, and appropriately displaying the adjusted signals and low level indication signal.

In light of the above-described preferred embodiment, it is readily apparent the present invention provides a novel and improved sound level indicator which can be used for such pruposes as aiding people who have hearing impediments. Thus, the present invention is well adapted to carry out the objects and attain the ends and advantages previously mentioned as well as thos inherent therein.

While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for detecting sound, comprising:
   means for receiving a sound pressure wave and converting said pressure wave into a proportionate primary electrical signal;
   first amplifier means connected to said receiving means for amplifying said primary electrical signal;
   second amplifier means connected to said first amplifier means for further amplifying the amplified signal from said first amplifier means;
   rectifier means connected to said second amplifier means for rectifying said further amplified signal;
   averaging means connected to said rectifier means for obtaining a signal having a magnitude which is an average of the magnitude of the rectified signal;
   voltage-to-frequency converter means connected to said averaging means for converting said averaged-magnitude signal to an electrical signal having a frequency proportionate to the magnitude of said averaged-magnitude signal;
   means connected to said first amplifier means for monitoring the magnitude of said first amplified signal;
   means connected to said voltage-to-frequency converter means and to said monitoring means for adjusting said signal from said voltage-to-frequency converter means to thereby obtain an adjusted quantifiable signal;
   means connected to said adjustment means for quantifying and displaying said adjusted quantifiable signal; and
   means connected to said voltage-to-frequency converter means, said adjustment means, and said display means for controlling the timing of the operations thereof.

2. The sound level indicator recited in claim 1, further comprising:
   means connected to said rectifier means and said averaging means for providing a reference signal thereto.

3. The sound level indicator recited in claim 1, wherein said monitor means comprises a means for detecting when the magnitude of said first amplified signal is below a predetermined level.

4. The sound level indicator recited in claim 3, wherein said adjustment means comprises:
   a first counter means having first input means for receiving said signal from said voltage-to-frequency converter means, second input means for receiving an adjustment count, and first output means;
   a second counter means having control input means for receiving count adjustment control signals, and second output means, said second output means being connected to said second input means of said first counter means for providing said adjustment count thereto; and
   means for controlling said first and second counter means, said controller means having third input means, first command means, and second command means, said third input means being associated with said detection member of said monitor means and with said first output means of said first counter means for receiving signals therefrom, and said first and second command means being associated with said control input means of said second counter means for providing count adjustment signals thereto.

5. The sound level indicator recited in claim 1, wherein said display means comprises:
   vibrator means for tactilely stimulating a user of said sound level indicator;
   means associated with said timing means for providing activation signals for controlling said vibrator means; and
   vibrator connect means connected to said vibrator means and said vibrator control means for activating said vibrator means in response to said activation signals.

6. The sound level indicator recited in claim 5, wherein said vibrator control means comprises:
   means associated with said timing means for controlling the setting of a trigger level count for said vibrator means;
   means associated with said trigger level set control means for setting said trigger level count; and
   means associated with said trigger level set counter means and with said vibrator connect means for comparing said trigger level count to the quantity of said adjusted quantifiable signal to thereby generate said activation signal when said quantity is equal to or greater than said trigger level count.

7. An electronic apparatus for detecting sound pressure waves having intensities at least as high as conversational human speech, comprising:
   receiver means for receiving said pressure waves and for converting them into electrical signals;
   first amplifier means coupled to said receiver means;
   second amplifier means connected to said first amplifier means;
   rectifier means coupled to said second amplifier means;
   averaging means connected to said rectifier means;
   voltage reference means connected to said rectifier means and said averaging means;
   first offset adjust means connected to said averaging means;
   voltage-to-frequency converter means connected to said first offset adjust means, said voltage-to-frequency converter having an input activation level;
   low level monitor means connected to said first amplifier means;
   second offset adjust means connected to said voltage-to-frequency converter means and said low level monitor means;
   indicator means associated with said second offset adjust means; and
   timer means associated with said voltage-to-frequency converter means, said second offset adjust means, and said indicator means.

8. The sound level indicator recited in claim 7, wherein said low level monitor means includes a means for generating a signal to indicate the intensity of said received sound pressure waves is below a predetermined level.

9. The sound level indicator recited in claim 8, wherein said first offset adjust means includes means for providing a voltage level having an initial magnitude greater than the input activation level of said voltage-to-frequency converter means.

10. The sound level indicator recited in claim 9, wherein said second offset adjust means includes:

a first counter means having first input means, second input means, and first output means, said first input means associated with said voltage-to-frequency converter means;

a second counter means having control input means and second output means, said second output means connected to said second input means of said first counter means; and means for controlling said first and second counter means having third input means, first command means, and second command means, said third input means associated with said detection member of said monitor means and with said first output means of said first counter means, and said first and second command means associated with said control input means of said second counter means.

11. The sound level indicator recited in claim 10, wherein said voltage-to-frequency converter means is a voltage-controlled oscillator having an inhibit control input for receiving an inhibit control signal from said timer means so that said voltage-controlled oscillator is activated for discrete periods of time.

12. The sound level indicator recited in claim 11, wherein said indicator means includes:

a vibrator member having a plurality of selectible trigger levels;

means for selecting one of said plurality of trigger levels;

means for determining the event of said detected sound pressure wave exceeding a selected one of said trigger levels; and means for periodically activating said vibrator member when said event occurs.

13. The sound level indicator recited in claim 12, wherein said rectifier means includes means for half-wave rectifying an alternating electrical signal at the reference voltage level of said voltage reference means.

14. The sound level indicator recited in claim 13, wherein said averaging means includes means for low-pass averaging the half-wave rectified signal from said rectifier means.

15. A method of indicating sound levels, comprising the steps of:

receiving a sound pressure wave;

converting said pressure wave into a first alternating electrical signal;

amplifying said first alternating electrical signal;

rectifying said first alternating electrical signal;

creating an averaged electrical signal having a magnitude of the average of said rectified electrical signal;

adding a DC voltage to said averaged electrical signal;

changing said added DC voltage and averaged electrical signal into a second alternating electrical signal;

adjusting said second alternating electrical signal;

quantifying said adjusted second alternating electrical signal;

monitoring said first alternating electrical signal;

providing an electrical control signal when said monitored first alternating electrical signal is below a predetermined level; and displaying said quantified adjusted second alternating electrical signal and said control signal.

16. A sound level indicator, comprising:

signal processing means for detecting sound intensities and for transforming the portion of said sound intensities having magnitudes greater than a predetermined level into unadjusted quantifiable signals;

monitoring means associated with said signal processing means for indicating when said sound intensities are not greater than said predetermined level;

adjustment means associated with said signal processing means and said monitoring means for adjusting said quantifiable signals, said adjustment means including:

circuit means for establishing a voltage level within said signal processing means and for summing said voltage level with said detected sound intensities;

first counter means for receiving and adjusting said unadjusted quantifiable signals;

second counter means for providing adjustment signals to said first counter means; and control means for activating said second counter means to provide adjustment signals to said first counter means and for activating said first counter means to receive said unadjusted quantifiable signals and to adjust said unadjusted signals according to said adjustment signals from said second counter means; and indicator means associated with said adjustment means for quantifying said adjusted quantifiable signals and for displaying the quantification thereof.

17. A sound level indicator, comprising:

signal processing means for detecting sound intensities and for transforming the portion of said sound intensities having magnitudes greater than a predetermined level into unadjusted quantifiable signals;

monitoring means associated with said signal processing means for indicating when said sound intensities are not greater than said predetermined level;

adjustment means associated with said signal processing means and said monitoring means for adjusting said quantifiable signals; and indicator means associated with said adjustment means for quantifying said adjusted quantifiable signals and for displaying the quantification thereof, said indicator means including tactile indicator means having a variable activation level for tactilely alerting a user of said sound level indicator when said variable activation level is exceeded by said adjusted quantifiable signal.

18. The sound level indicator recited in claim 17, wherein said tactile indicator means includes:

variable counter means for providing said variable activation level;

storage counter means for storing said activation level from said variable counter means and for indicating a comparison between said stored activation level and the quantity of said adjusted quantifiable signals; and activation means for activating said tactile indicator means when said storage counter means indicates the quantity of said adjusted quantifiable signals exceeds said stored activation level.

19. A sound level indicator, comprising:

signal processing circuit means for detecting a pressure wave and for transforming said pressure wave, when said pressure wave has a magnitude greater than a predetermined level, into a first electrical signal having an unadjusted number of quantifiable portions;

monitoring circuit means, associated with said signal processing circuit means, for providing a second electrical signal when the magnitude of said detected pressure wave is not greater than said predetermined level;

adjustment circuit means, associated with said signal processing circuit means and said monitoring circuit means, for automatically adjusting said unadjusted number of quantifiable portions of said first electrical signal to that a consistent, adjusted number of quantifiable portions of said first electrical signal is provided each time pressure waves having substantially identical magnitudes are detected and transformed by said signal processing circuit means; and indicator circuit means, associated with said adjustment means, for quantifying the adjusted number of quantifiable portions of said first electrical signal.

20. A sound level indicator as recited in claim 19, wherein said adjustment circuit means includes:

voltage reference circuit means for establishing a voltage level within said signal processing circuit means and for summing said voltage level with said first electrical signal;

first counter means for receiving and automatically adjusting the number of quantifiable portions of said first electrical signal;

second counter means for providing an adjustment electrical signal to said first counter means; and control circuit means, responsive to said signal processing circuit means and said monitoring circuit means, for activating said second counter means so that said adjustment electrical signal is provided to said first counter means and for activating said first counter means so that said unadjusted number of quantifiable portions of said first electrical signal is received thereby and so that said unadjusted number of quantifiable portions is adjusted by said adjustment electrical signal from said second counter means.

21. A sound level indicator as recited in claim 19, wherein said indicator circuit means includes tactile indicator means having a variable activation level for tactilely indicating to a user of said sound level indicator when said variable activation level is exceeded by the adjusted number of quantifiable portions of said first signal.

22. A sound level indicator as recited in claim 21, wherein said tactile indicator means includes:

variable counter means for providing said variable activation level;

storage counter means for storing said activation level from said variable counter means and for indicating a comparison between said stored activation level and the adjusted number of quantifiable portions of said first electrical signal;

a member for physically contacting a user of said sound level indicator; and activation means for activating said member when said storage counter means indicates the adjusted number of said quantifiable portions of said first electrical signal exceeds said stored activation level.

23. A timepiece sound level indicator for indicating the time of day and the presence of sound, comprising:

fist integrated circuit means for providing operational amplifier means;

second integrated circuit means for providing voltage-controlled oscillator means;

first connecting means for electrically interconnecting said first and second integrated circuit means so that a sound pressure wave is detected and transformed into a first electrical signal having an unadjusted number of quantifiable portions when the pressure wave has a magnitude greater than a determined level and so that a second electrical signal is provided when the pressure wave has a magnitude which is not greater than said predetermined level;

visual display means;

third integrated circuit means, including:

electronic adjusting circuit means for receiving the first electrical signal having an unadjusted number of quantifiable portions, for receiving the second electrical signal, and for automatically adjusting the number of quantifiable portions of the first electrical signal so that a consistent number of quantifiable portions is provided each time pressure waves having substantially identical magnitudes are detected and transformed; and electronic control circuit means for controlling said visual display means;

fourth integrated circuit means for providing a time clock; and second connecting means for electrically connecting said third and fourth integrated circuit means to said visual display means and for interconnecting said third and fourth integrated circuit means to each other so that said visual display means is shared thereby for indicating both the time of day and the presence of sound.

24. A timepiece sound level indicator as recited in claim 23, further comprising:

a case for containing said first integrated circuit means, said second integrated circuit means, said third integrated circuit means, said fourth integrated circuit means, said visual display means, said first connecting means, and said second connecting means, said case having a size so that said case is wearable on a wrist of a user of said timepiece sound level indicator; and means for retaining said case on the wrist of the user.

25. A timepiece sound level indicator as recited in claim 24, further comprising:

a vibrator member mounted on said case so that said vibrator member physically contacts the user when said vibrator member is actuated; and fifth integrated circuit means, contained within said case, for switchably electrically connecting said vibrator member to said third integrated circuit means so that said vibrator member is actuated when a pressure wave having a magnitude greater than a selectable predetermined value is detected by said timepiece sound level indicator.

* * * * *

UNITED STATES PATENT AND TRADEMARK OFFICE
CERTIFICATE OF CORRECTION

PATENT NO. : 4,277,980

DATED : July 14, 1981

INVENTOR(S) : Montgomery R. Coats and Turner C. Pendleton

It is certified that error appears in the above-identified patent and that said Letters Patent are hereby corrected as shown below:

Delete "Reine H. Pendleton, 1910 N. Indiana, Oklahoma City, Okla. 73106" as an inventor as set forth in the section "Inventors" on page 1.

Signed and Sealed this

Seventeenth Day of November 1981

[SEAL]

Attest:

GERALD J. MOSSINGHOFF

Attesting Officer

Commissioner of Patents and Trademarks